(12) United States Patent
Surpin et al.

(10) Patent No.: US 11,882,836 B2
(45) Date of Patent: Jan. 30, 2024

(54) 1-AMINO-1-CYCLOPROPANECARBOXYLIC ACID MIXTURES AND USES THEREOF

(71) Applicant: Valent BioSciences LLC, Libertyville, IL (US)

(72) Inventors: Marci Ann Surpin, Highland Park, IL (US); Robert Fritts, Jr., Clovis, CA (US); Derek Woolard, Zion, IL (US); Franklin Paul Silverman, Highland Park, IL (US)

(73) Assignee: VALENT BIOSCIENCES LLC, Libertyville, IL (US)

( * ) Notice: Subject to any disclaimer, the term of this patent is extended or adjusted under 35 U.S.C. 154(b) by 0 days.

(21) Appl. No.: 17/356,783

(22) Filed: Jun. 24, 2021

(65) Prior Publication Data
US 2021/0400978 A1 Dec. 30, 2021

Related U.S. Application Data

(60) Provisional application No. 63/044,566, filed on Jun. 26, 2020.

(51) Int. Cl.
*A01N 53/00* (2006.01)
*A01N 25/30* (2006.01)
*C05C 1/00* (2006.01)

(52) U.S. Cl.
CPC ............. *A01N 53/00* (2013.01); *A01N 25/30* (2013.01); *C05C 1/00* (2013.01)

(58) Field of Classification Search
CPC ........ A01N 31/02; A01N 53/00; A01N 25/30; A01N 37/18; C05C 1/00
See application file for complete search history.

(56) References Cited

U.S. PATENT DOCUMENTS

| 4,911,750 | A | * | 3/1990 | Lurssen | ............... | C07D 231/12 |
| | | | | | | 504/128 |
| 10,542,753 | B2 | | 1/2020 | Molloy | | |
| 2019/0014784 | A1 | * | 1/2019 | Woolard | ............... | A01N 53/00 |

FOREIGN PATENT DOCUMENTS

WO WO-2019165172 A1 * 8/2019 ............. A01N 43/40

OTHER PUBLICATIONS

Tohbe et al. The influenced of Substances Related to Ethylene Biosynthesis on Breaking Bud Dormancy in Grapevine Japanese Society of Horticultural Science 67(6): 902-906, 1998 (Year: 1998).*
English translation of Tohbe et al. 2022, 19 pp. (Year: 2022).*
International Search Report and Written Opinion from Corresponding PCT Application No. PCT/US21/38851 dated Sep. 29, 2021.

* cited by examiner

*Primary Examiner* — June Hwu
(74) *Attorney, Agent, or Firm* — Wood, Phillips, Katz, Clark & Mortimer

(57) ABSTRACT

The present invention relates to 1-amino-1-cyclopropanecarboxylic acid (ACC) mixtures. The present invention further relates to methods of promoting or synchronizing bud break in woody perennial plants by applying ACC mixtures and nitrogen containing fertilizer at a ratio from about 1:8.5 to about 1:510 of the present invention. The present invention further relates to methods of promoting plant growth in woody perennial plants by applying ACC mixtures and nitrogen containing fertilizer at a ratio from about 1:8.5 to about 1:510 of the present invention.

15 Claims, No Drawings

1-AMINO-1-CYCLOPROPANECARBOXYLIC ACID MIXTURES AND USES THEREOF

FIELD OF THE INVENTION

The present invention relates to 1-amino-1-cyclopropanecarboxylic acid ("ACC") mixtures. The present invention further relates to methods of promoting or synchronizing bud break in woody perennial plants by applying ACC mixtures of the present invention. The present invention further relates to methods of promoting growth in woody perennial plants by applying ACC mixtures of the present invention.

BACKGROUND OF THE INVENTION

Woody perennial plants such as deciduous fruit trees and grape vines require chilling temperatures between growing seasons to properly bear an acceptable fruit yield. Specifically, the plants develop a resting bud at the conclusion of the growing season that is more likely to survive between growing seasons. This bud stage is known as dormancy. In order for dormancy to be broken and woody perennial plant growth to resume, a threshold amount of chilling is required. Effective chilling is based on both the duration of chilling and the temperature of the chilling period. This is normally followed by elevated temperatures that break dormancy and lead to synchronous flowering and fruit development. This breaking of dormancy in woody perennial plants is known as bud break.

The most commercially successful bud dormancy breaking chemical is hydrogen cyanamide ("HC"). HC is the active agent in Dormex® (Dormex is a 50% hydrogen cyanide formulation and is a registered trademark of and available from AlzChem AG, Germany). In addition to compensating for a lack of chilling, HC has been used to initiate earlier and more synchronous bud break leading to increased fruit set and fruit yields. However, HC is highly toxic and has been shown to result in adverse human health effects from contact with the skin and/or mucous membranes. See, Schep et al., The adverse effects of hydrogen cyanamide on human health: an evaluation of inquiries to the New Zealand National Poisons Centre. *Clin Toxicol (Phila)*. 2009 47(1):58-60 and Update: hydrogen cyanamide-related illnesses—Italy, 2002-2004, MMWR Morb Mortal Wkly Rep, 2005 Apr 29, 54(16), 405-408. Moreover, high rates of HC are associated with in-season phytotoxicity and repeated use may result in long-term decline in vine health and yield.

1-amino-1-cyclopropanecarboxylic acid ("ACC") is synthesized by ACC synthase in plants and acts as a precursor for the biosynthesis of ethylene. Ethylene has been shown to be involved in several plant responses including flowering synchronization (pineapple), stress, fruit set, leaf abscission and anthesis. Because of its role as an ethylene precursor ACC is being used in agriculture to induce ethylene-responsive events.

Nitrogen-containing fertilizers are used to enhance growth in cultivated plant species. Nitrogen-containing fertilizers have also been shown to promote early bud break and bud break synchrony in apples, cherries and grapes. However, nitrogen containing fertilizers are not as effective or consistent as hydrogen cyanamide at breaking bud dormancy. See, Hawerroth F J, et al.: Erger and calcium nitrate concentration for budbreak induction in apple trees, *Acta Hort.*, 2010 August, 872(32), 239-244.

Accordingly, there is a need in the art for a composition that can break bud dormancy as well or better than hydrogen cyanamide, but without causing negative plant or animal health issues.

SUMMARY OF THE INVENTION

The present invention is directed to an agricultural composition for breaking bud dormancy comprising a mixture of an effective amount of 1-amino-1-cyclopropanecarboxylic acid ("ACC") or salts thereof and an effective amount of a nitrogen containing fertilizer wherein the ACC or salts thereof and the nitrogen containing fertilizer are present at a ratio from about 1:0.3 to about 1:3,000.

The present invention is further directed to a method of promoting earlier bud break or synchronizing bud break and flowering in woody perennial plants by applying a composition comprising an effective amount of ACC or salts thereof and an effective amount of a nitrogen containing fertilizer, wherein the ACC or salts thereof and the nitrogen containing fertilizer are present at a ratio from about 1:0.3 to about 1:3,000.

The present invention is further directed to a method of promoting plant growth in woody perennial plants by applying a composition comprising an effective amount of ACC or salts thereof and an effective amount of a nitrogen containing fertilizer, wherein the ACC or salts thereof and the nitrogen containing fertilizer are present at a ratio from about 1:0.3 to about 1:3,000.

DETAILED DESCRIPTION OF THE INVENTION

ACC mixtures of the present invention were unexpectedly found to promote and synchronize bud break (i.e. initiation of growth) in woody perennial plants equal to or greater than the commercial bud break standard, Dormex®. Further, ACC mixtures of the present invention were unexpectedly found to promote and synchronize bud break (i.e. initiation of growth) and promote plant growth in woody perennial plants at a rate greater than the sum of the effects of each active agent alone.

As used herein the phrase "breaking bud dormancy" or "bud break" refers to the initiation of growth from the bud following a period of dormancy.

As used herein the term "promoting" refers to earlier initiating or enhancing.

As used herein the term 1-amino-1-cyclopropanecarboxylic acid or ACC refers to the following chemical structure:

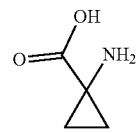

having CAS number 22059-21-8.

Salts that can be used in accordance with the current invention include but are not limited to hydrochloride, dihydrate hydrochloride, hydrobromide, hydroiodide, nitrate, sulfate, bisulfate, phosphate, acid phosphate, isonicotinate, acetate, lactate, potassium, salicylate, citrate, tartrate, pantothenate, bitartrate, ascorbate, succinate, mesylate, maleate, gentisinate, fumarate, tannate, sulphate, tosylate, esylate, gluconate, glucaronate, saccharate, formate, benzoate, glutamate, methanesulfonate, ethanesulfonate, benzensulfonate, p-toluenesulfonate and pamoate (i.e., 1,1'-methylene-bis-(2-hydroxy-3-naphthoate)) salts.

As used herein the term "nitrogen-containing fertilizer" refers to a fertilizer that contains nitrogen.

As used herein the term "calcium ammonium nitrate fertilizer" refers to a fertilizer that contains calcium and nitrogen in the form of nitrate and ammonium.

"15-0-0 fertilizer" refers to a fertilizer containing about 15% nitrogen including Erger® (Erger is a fertilizer that contains 15% nitrogen, 0% phosphorus and 0% potassium and is a registered trademark of Valagro S.P.A., Italy and is available from Helena Chemical Company, Collierville, Tenn, USA) and all formulations described in International PCT application publication WO/2001/037653A2 by Valagro S.P.A., Italy, which is incorporated, herein, in its entirety. Erger® was used in combination with Activ Erger® (Valagro S.P.A., Italy), which is an additional source of nitrogen.

As used herein the term "17-0-0 fertilizer" refers to a fertilizer containing about 17% nitrogen. CAN17® was used as the source of 17-0-0 fertilizer. CAN17 contains 17% total nitrogen as 4.6% ammonium nitrogen and 11.6% nitrate nitrogen and 1.3% urea nitrogen and 8.8% calcium derived from ammonium nitrate and calcium nitrate. CAN17 is available from J.R. Simplot Company (Boise, Id., USA).

As used herein the term "27-0-0 fertilizer" refers to a fertilizer containing about 27% nitrogen. CAN 27 is one commercial source of 27-0-0 fertilizer. YaraBela CAN 27 contains 27% nitrogen as 13.5% nitrate and 13.5% ammoniacal, 4% calcium and 1% magnesium.

The present invention can be applied via spray, drench, drip, painting or rolling on with a brush, wiping on and chemigation techniques.

As used herein, all numerical values relating to amounts, ratios, weight percentages and the like are defined as "about" or "approximately" each particular value, plus or minus 10%. For example, the phrase "at least 5.0% by weight" is to be understood as "at least 4.5% to 5.5% by weight." Therefore, amounts within 10% of the claimed values are encompassed by the scope of the claims.

As used herein, "effective amount" refers to the amount of the ACC or salts thereof and/or fertilizer that will improve bud break, bud break synchrony and/or increase fresh weight. The "effective amount" will vary depending on the ACC or salts thereof and fertilizer concentrations, the plant species or variety being treated, the result desired, and the life stage of the plants, among other factors. Thus, it is not always possible to specify an exact "effective amount."

In one embodiment, the present invention is directed to an agricultural composition for breaking bud dormancy comprising a mixture of an effective amount of ACC or salts thereof and an effective amount of a nitrogen containing fertilizer, wherein the ACC or salts thereof and the nitrogen containing fertilizer are present at a ratio from about 1:0.3 to about 1:3,000.

In one embodiment, the effective amount of ACC or salts thereof is from about 1 to about 10,000 parts per million ("ppm"), preferably from about 100 to about 3,000 ppm, more preferably from about 300 to about 1,000 ppm and most preferably about 300 or about 1,000 ppm.

In a preferred embodiment, the nitrogen containing fertilizer is a calcium ammonium nitrate fertilizer.

In a more preferred embodiment, the nitrogen containing fertilizer is selected from the group consisting of 15-0-0 fertilizer, 17-0-0 fertilizer and 27-0-0 fertilizer.

In one embodiment, the effective amount of nitrogen containing fertilizer is from about 1% to about 90%, preferably from about 3% to about 50%, more preferably from about 3% to about 30%, even more preferably from about 6% to about 30% and most preferably about 6% or about 30%.

In another embodiment, the compositions of the present invention further comprise a surfactant. Surfactants suitable for use in the present invention include, but are not limited to, nonionic surfactants, anionic surfactants, silicone surfactants and mixtures thereof.

Nonionic surfactants include, but are not limited to, polysorbates such as polysorbate 20, polysorbate 40, polysorbate 60 and polysorbate 80, sorbitan derivatives such as Tween® 80, Tween® 85 (Tween® is a registered trademark of Croda Americas, Inc., Tween® 80 and 85 are available from Croda, Inc.), ethoxylated alcohols such as Brij® 98 (Brij® is a registered trademark of Uniqema Americas LLC, Brij® 98 is available from Croda Inc.), ethoxylated alkylphenols such as Igepol CA-630, Igepol, and Igepol CO-630 from Rhodia Inc., ethoxylated fatty acids such as Myrj® 52 (Myrj® is a registered trademark of Atlas Powder Company, Myrj® 52 is available from Croda Inc.), silicone based surfactants such as Silwet L-77® (Silwet and Silwet L-77 are registered trademarks of Momentive Performance Chemicals, Silwet L-77® is available from Momentive Performance Chemicals), and block polymeric surfactants such as Pluronic® P85 and Pluronic® P104 (Pluronic is a registered trademark of BASF Corporation, Pluronic® P85 and P104 are available from BASF Corporation) and mixtures thereof.

Anionic surfactants include, but are not limited to, water-soluble salts of higher fatty acid monoglyceride monosulfates, such as the sodium salt of the monosulfated monoglyceride of hydrogenated coconut oil fatty acids, higher alkyl sulfates, such as sodium lauryl sulfate, alkyl aryl sulfonates, such as sodium dodecyl benzene sulfonate, alkyl ethoxy sulfates, monoalkylphosphates, α-olefin sulphonates, higher fatty acid esters of 1,2-dihydroxypropane sulfonate, organic phosphates esters, such as mono- and di-alkylethoxyphosphates, and the substantially saturated higher aliphatic acyl amides of lower aliphatic amino carboxylic acid compounds, such as those having 12 to 16 carbons in the fatty acid, alkyl or acyl radicals, and mixtures thereof.

Silicone surfactants include, but are not limited to, disodium PEG-12 dimethicone sulfosuccinate (available from McIntyre Group, Ltd. under the tradename Mackanate DC-100), and PEG-12 dimethicone, PEG-10 dimethicone, PEG-8 dimethicone, PEG-7 dimethicone, PEG-7 dimethicone succinate (all available from SilTech, LLC), PEG-20/PPG-6 dimethicone, PEG-14/PPG-4 dimethicone, PEG-4/PPG-12 dimethicone, PEG-20/PPG-20 dimethicone (available from Evonik), dimethylsiloxane and methyl(polyoxyethylene)siloxane copolymers (available from Shin Etsu Silicones), dimethylsiloxane and methyl(polyoxyethylene)siloxane and methyl(polyoxypropyl)siloxane copolymers (available from Shin Etsu Silicones), SILSOFT (available from Momentus Performance Materials), including, for example, PEG-8 trisiloxane PEG-8/PPG-26 dimethicone, PEG-20/PPG-23 dimethicone, PEG-20/PPG-15 dimethicone, PEG-23/PPG-6 dimethicone, PEG-17 dimethicone and PPG-12 dimethicone and mixtures thereof.

In another embodiment, the present invention is directed to a method of promoting or synchronizing bud break and flowering in woody perennial plants, preferably grape vines, comprising applying a composition comprising an effective amount of ACC or salts thereof and an effective amount of a nitrogen containing fertilizer, wherein the ACC or salts thereof and the nitrogen containing fertilizer are present at a ratio from about 1:0.3 to about 1:3,000.

In another embodiment, the present invention is directed to a method of promoting plant growth in woody perennial plants, preferably grape vines, comprising applying a composition comprising an effective amount of ACC or salts thereof and an effective amount of a nitrogen containing fertilizer, wherein the ACC or salts thereof and the nitrogen containing fertilizer are present at a ratio from about 1:0.3 to about 1:3,000.

In methods of the present invention, ACC or salts thereof and the nitrogen containing fertilizer may be applied sequentially or concurrently.

In a preferred embodiment, the present invention is directed to an agricultural composition for breaking bud dormancy comprising ACC or salts thereof and 15-0-0 fertilizer at a ratio from about 1:10 to about 1:1,000, more preferably from about 1:60 to about 1:200.

In another preferred embodiment, the present invention is directed to an agricultural composition for breaking bud dormancy comprising ACC or salts thereof and 17-0-0 fertilizer at a ratio from about 1:100 to about 1:3,000, more preferably from about 1:300 to about 1:1000.

Woody perennial plants refer to plants with stems that do not die back to the ground from which they grew and include, but are not limited to, grape vines, kiwifruit vines, stone fruit trees including but not limited to peach trees, nectarine trees, apricot trees, and cherry trees, apple trees, pear trees, blueberry bushes, brambles including raspberry and blackberry.

In one embodiment, woody perennial plants do not include grape vines.

These representative embodiments are in no way limiting and are described solely to illustrate some aspects of the invention.

The following example is offered by way of illustration only and not by way of limitation.

EXAMPLES

Example 1—ACC Mixtures Efficacy on Malus

Method

To assess the ability of mixtures of the invention to promote and synchronize bud break, these mixtures were applied to field-grown Malus (apple) rootstocks and examined for bud break (initiation of growth) and subsequent shoot development. ACC, Dormex® (50% HC), 15-0-0 (Erger®) and 17-0-0 fertilizers (CAN17), and mixtures thereof were each applied individually or sequentially (co-applied) to the shoots of potted Malus rootstocks that were pruned to a height of 25 centimeters. Plants were evaluated for bud break at 28 days after treatment. Results of these evaluations can be seen below in Tables 1-5, below.

To determine if the mixtures provided unexpected results, the observed combined efficacy ("OCE") was divided by the expected combined efficacy ("ECE") wherein the expected ECE is calculated by the Abbott method:

ECE=$A+B-(AB/100)$, wherein ECE is the expected combined efficacy and in which A and B are the speed of bud break relative to control, the number of buds broken per plant relative to control, shoot length relative to control or shoot weight relative to control given by the single active ingredients. If the ratio between the OCE of the mixture and the ECE of the mixture is greater than 1, then greater than expected interactions are present in the mixture. (Gisi, Synergistic Interaction of Fungicides in Mixtures, The American Phytopathological Society, 86:11, 1273-1279, 1996).

TABLE 1

Bud Break Synchrony

| | 50% BB | 50% BB ECE | 50% BB OCE | 50% BB OCE:ECE |
|---|---|---|---|---|
| Control | 14 | — | — | — |
| 1% HC (v/v) | 12 | — | — | — |
| ACC 300 ppm | 14 | — | — | — |
| ACC 1000 ppm | 16 | — | — | — |
| CAN17 30% (v/v) | 14 | — | — | — |
| Erger ® 6% + 20% (w/v) Ca(NO$_3$)$_2$ | 14 | — | — | — |
| ACC 300 ppm + CAN17 30% | 14 | 0 | 0 | 0 |
| ACC 1000 ppm + CAN17 30% | 12 | −2 | 2 | 3* |
| ACC 1000 ppm + Erger ® 6% + 20% (w/v) Ca(NO$_3$)$_2$ | 14 | 0 | 0 | 0 |

*To calculate OCE:ECE ratios negative expected values were normalized to positive values and the corresponding observed values were increased linearly.

As seen in Table 1, above, application of 1% HC was the standard for bud breaking, causing 50% of the Malus to break dormancy by 12 DAT. However, the mixture of 1000 ppm ACC and 30% 17-0-0 fertilizer reached bud break in the same time. Control plants took 14 days to reach 50% bud break. This data demonstrates that mixtures of ACC and particular nitrogen containing fertilizers work as well as the industry standard HC at causing bud break.

The mixtures of ACC and 17-0-0 fertilizers provided unexpected combined efficacy for several parameters. Specifically, a mixture of 1000 ppm ACC and 30% 17-0-0 fertilizer provided an OCE:ECE ratio of 3. Thus, application of mixtures of the present invention lead to unexpected promotion of dormancy breaking that are similar to commercial applications.

TABLE 2

Average Number of Broken Buds Per Malus Plant at Harvest

| | | ECE | OCE | OCE:ECE |
|---|---|---|---|---|
| Control | 6.13 | — | — | — |
| 1% HC (v/v) | 8.13 | — | — | — |
| ACC 300 ppm | 6.13 | — | — | — |
| ACC 1000 ppm | 7.38 | — | — | — |
| CAN17 30% (v/v) | 4.50 | — | — | — |
| Erger ® 6% + 20% (w/v) Ca(NO$_3$)$_2$ | 5.00 | — | — | — |

TABLE 2-continued

Average Number of Broken Buds Per Malus Plant at Harvest

|  | ECE | OCE | OCE:ECE |  |
|---|---|---|---|---|
| ACC 300 ppm + CAN17 30% | 4.63 | 1.63 | −1.5 | −0.92 |
| ACC 1000 ppm + CAN17 30% | 3.75 | 0.13 | −2.38 | −17.75 |
| ACC 1000 ppm + Erger® 6% + 20% (w/v) Ca(NO$_3$)$_2$ | 5.63 | −3.15 | −0.5 | 1.84* |

*To calculate OCE:ECE ratios negative expected values were normalized to positive values and the corresponding observed values were increased linearly.

TABLE 3

Average Number of Broken Nodes Per Centimeter of Shoot at Harvest

|  | ECE | OCE | OCE:ECE |
|---|---|---|---|
| Control | 0.245 | — | — | — |
| 1% HC (v/v) | 0.325 | — | — | — |
| ACC 300 ppm | 0.25 | — | — | — |
| ACC 1000 ppm | 0.30 | — | — | — |
| CAN17 30% (v/v) | 0.18 | — | — | — |
| Erger® 6% + 20% (w/v) Ca(NO$_3$)$_2$ | 0.20 | — | — | — |
| ACC 300 ppm + CAN17 30% | 0.19 | 0.06 | −0.06 | −0.92 |
| ACC 1000 ppm + CAN17 30% | 0.15 | 0.01 | −0.10 | −9.48 |
| ACC 1000 ppm + Erger® 6% + 20% (w/v) Ca(NO$_3$)$_2$ | 0.23 | −0.12 | −0.02 | 1.83* |

*To calculate OCE:ECE ratios negative expected values were normalized to positive values and the corresponding observed values were increased linearly.

At harvest (28 days after planting), the number of buds broken per plant and per centimeter of shoot was assessed. As can be seen in Tables 2 and 3, above, application of 1% HC was the standard for bud breaking, causing apples to average 8.13 broken buds per plant and 0.325 nodes per centimeter of shoot. However, a mixture of 1000 ppm ACC and 6% Erger® caused an unexpected number of broken buds per plant and per centimeter of shoot than 1% HC. Thus, application of mixtures of the present invention lead to unexpected promotion of dormancy breaking that are similar to the commercial standard, Dormex®.

TABLE 4

Fresh Weight at Harvest

|  | ECE | OCE | OCE:ECE |
|---|---|---|---|
| Control | 5.83 | — | — | — |
| 1% HC (v/v) | 7.99 | — | — | — |
| ACC 300 ppm | 4.34 | — | — | — |
| ACC 1000 ppm | 3.05 | — | — | — |
| CAN17 30% (v/v) | 4.27 | — | — | — |
| Erger® 6% + 20% (w/v) Ca(NO$_3$)$_2$ | 4.02 | — | — | — |
| ACC 300 ppm + CAN17 30% | 4.32 | 3.03 | −1.51 | −0.50 |
| ACC 1000 ppm + CAN17 30% | 5.12 | −4.64 | −0.71 | 1.85* |
| ACC 1000 ppm + Erger® 6% + 20% (w/v) Ca(NO$_3$)$_2$ | 4.63 | −3.10 | −1.2 | 1.61* |

*To calculate OCE:ECE ratios negative expected values were normalized to positive values and the corresponding observed values were increased linearly.

TABLE 5

Fresh Weight per Bud at Harvest

|  | ECE | OCE | OCE:ECE |
|---|---|---|---|
| Control | 0.91 | — | — | — |
| 1% HC (v/v) | 0.98 | — | — | — |
| ACC 300 ppm | 0.66 | — | — | — |
| ACC 1000 ppm | 0.46 | — | — | — |
| CAN17 30% (v/v) | 1.04 | — | — | — |
| Erger® 6% + 20% (w/v) Ca(NO$_3$)$_2$ | 1.06 | — | — | — |
| ACC 300 ppm + CAN17 30% | 1.17 | 0.12 | 0.26 | 2.16 |
| ACC 1000 ppm + CAN17 30% | 1.89 | −0.30 | 0.98 | 5.27* |
| ACC 1000 ppm + Erger® 6% + 20% (w/v) Ca(NO$_3$)$_2$ | 0.93 | 0.39 | 0.02 | 0.05 |

*To calculate OCE:ECE ratios negative expected values were normalized to positive values and the corresponding observed values were increased linearly.

At harvest (28 days after planting), the fresh weight and fresh weight per broken bud was assessed. As seen in Tables 4 and 5, above, application of 1% HC was the standard for fresh weight, causing Malus rootstocks to average 7.99 grams combined new shoot growth which equaled 0.98 combined shoot fresh weight per bud. Both mixtures of 300 ppm and 1000 ppm ACC and 30% 17-0-0 fertilizer resulted in greater fresh weight per bud than 1% HC. Further, mixtures of 1000 ppm ACC and fertilizer resulted in greater than expected fresh weight and mixtures of 300 and 1000 ppm ACC and 30% 17-0-0 fertilizer resulted in greater than expected grams fresh weight per bud. This data demonstrates that mixtures of ACC and particular nitrogen containing fertilizers work better than the industry leading HC at improving fresh weight. Further, application of mixtures of the present invention lead to unexpected promotion of dormancy breaking that are similar to or better than commercial applications.

Example 2—ACC Mixtures Efficacy on *Prunus*

Method

To assess the ability of mixtures of the invention to promote and synchronize bud break, these mixtures were applied to *Prunus* (stone fruit) plants in the greenhouse and examined for bud break (initiation of growth) and subsequent shoot development. ACC, Dormex® (50% HC), 15-0-0 (Erger®) and 17-0-0 fertilizers (CAN17), and mixtures thereof were each applied individually or sequentially (co-applied) to the shoots of *Prunus* plants. Plants were evaluated for bud break at 28 days after treatment. Results of these evaluations can be seen below in Tables 6 and 7, below.

TABLE 6

Bud Break Synchrony

|  | 50% BB | 50% BB ECE | 50% BB OCE | 50% BB OCE:ECE |
|---|---|---|---|---|
| Control | 14 | — | — | — |
| 1% HC (v/v) | 7 | — | — | — |
| ACC 300 ppm | 12 | — | — | — |
| ACC 1000 ppm | 7 | — | — | — |
| CAN17 30% (v/v) | 5 | — | — | — |
| Erger® 6% + 20% (w/v) Ca(NO$_3$)$_2$ | 10 | — | — | — |
| ACC 300 ppm + CAN17 30% | 7 | 10.82 | 7 | 0.65 |

TABLE 6-continued

Bud Break Synchrony

|  | 50% BB | 50% BB ECE | 50% BB OCE | 50% BB OCE:ECE |
|---|---|---|---|---|
| ACC 1000 ppm + CAN17 30% | 5 | 10.72 | 9 | 0.84 |
| ACC 1000 ppm + Erger ® 6% + 20% (w/v) Ca(NO$_3$)$_2$ | 5 | 15.37 | 9 | 0.59 |

As seen in Table 6, above, application of 1% HC was the standard for bud breaking, causing *Prunus* to reach 50% bud break by 7 DAT. However, 30% 17-0-0 fertilizer and the mixture of 1000 ppm ACC and fertilizer and caused earlier bud break at 5 DAT. Further, the mixture of 300 ppm ACC and 30% 17-0-0 fertilizer caused the plants to reach 50% bud break in 7 DAT. Control plants took 14 days to reach 50% bud break. This data demonstrates that mixtures of ACC and nitrogen containing fertilizers work better and as well as the industry standard HC at causing bud break.

TABLE 7

Fresh Weight at Harvest

|  | FW (grams) | ECE | OCE | OCE:ECE |
|---|---|---|---|---|
| Control | 3.92 | — | — | — |
| 1% HC (v/v) | 4.76 | — | — | — |
| ACC 300 ppm | 3.95 | — | — | — |
| ACC 1000 ppm | 3.81 | — | — | — |
| CAN17 30% (v/v) | 6.11 | — | — | — |
| Erger ® 6% + 20% (w/v) Ca(NO$_3$)$_2$ | 4.30 | — | — | — |
| ACC 300 ppm + CAN17 30% | 5.06 | −2.22 | 1.14 | 2.53* |
| ACC 1000 ppm + CAN17 30% | 7.11 | 0.27 | 3.19 | 11.80 |

TABLE 7-continued

Fresh Weight at Harvest

|  | FW (grams) | ECE | OCE | OCE:ECE |
|---|---|---|---|---|
| ACC 1000 ppm + Erger ® 6% + 20% (w/v) Ca(NO$_3$)$_2$ | 4.97 | 3.31 | 1.05 | 0.32 |

*To calculate OCE:ECE ratio negative expected values were normalized to positive values and the corresponding observed values were increased linearly.
FW denotes fresh weight At harvest (28 days after planting), the fresh weight of new growth was assessed. As can be seen in Table 7, above, application of 1% HC was the standard for fresh weight, causing *Prunus* to average 4.76 grams combined new shoot fresh weight. Mixtures of ACC and fertilizer resulted in greater fresh weight than 1% HC. This data demonstrates that mixtures of ACC and particular nitrogen containing fertilizers work as well as the industry leading HC at improving fresh weight.

Further, the mixtures of ACC and 17-0-0 fertilizers provided unexpected combined efficacy for several parameters. Specifically, 300 and 1000 ppm ACC and 30% 17-0-0 fertilizer resulted in fresh weight per plant with OCE:ECE ratio of 2.53 and 11.80. Thus, application of mixtures of the present invention lead to unexpected promotion of dormancy breaking that are similar to or better than commercial applications.

Example 3—Further ACC Mixtures Efficacy on *Prunus*

Method

To assess the ability of mixtures of the invention to promote and synchronize bud break, these mixtures were applied to *Prunus* (stone fruit) plants in the greenhouse and examined for bud break (initiation of growth) and subsequent shoot development. ACC, Dormex® (50% HC), and 17-0-0 fertilizers (CAN17), and mixtures thereof were each applied individually or sequentially (co-applied) to the shoots of *Prunus* plants. Plants were evaluated for bud break from 4-21 days after treatment. Results of these evaluations can be seen below in Tables 8 —10, below.

TABLE 8

Bud Break Synchrony

|  | 50% BB | 50% BB ECE | 50% BB OCE | 50% BB OCE:ECE |
|---|---|---|---|---|
| Control | 10 | — | — | — |
| 1% HC (v/v) | 9 | — | — | — |
| ACC 100 ppm | 11 | — | — | — |
| ACC 300 ppm | 10 | — | — | — |
| ACC 600 ppm | 10 | — | — | — |
| CAN17 3% (v/v) | 10 | — | — | — |
| CAN17 10% (v/v) | 8 | — | — | — |
| CAN17 30% (v/v) | 8 | — | — | — |
| ACC 100 ppm + CAN17 10% | 9 | 1.0 | 1 | 1.0 |
| ACC 100 ppm + CAN17 30% | 8 | 1.0 | 2 | 2.0 |
| ACC 300 ppm + CAN17 3% | 9 | 1.0 | 2 | 2.0 |
| ACC 300 ppm + CAN17 10% | 7 | 1.5 | 2 | 1.5 |
| ACC 300 ppm + CAN17 30% | 8 | 2.0 | 2.0 | 1.0 |
| ACC 600 ppm + CAN17 3% | 8 | 1.0 | 2 | 2.0 |
| ACC 600 ppm + CAN17 10% | 8 | 2.0 | 2 | 1.0 |
| ACC 600 ppm + CAN17 30% | 8 | 2.0 | 2 | 1.0 |

* To calculate OCE:ECE ratios negative expected values were normalized to positive values and the corresponding observed values were increased linearly.

As seen in Table 8, above, application of 1% HC was the standard for bud breaking, causing 50% of the Malus to break dormancy by 9 DAT. However, the mixture of 100 ppm ACC and 30% 17-0-0 fertilizer and 300 ppm ACC and 10% 17-0-0 fertilizer reached bud break in the same time. Further, the mixture of 100 ppm ACC and 30% 17-0-0 fertilizer, 300 ppm ACC and 30% 17-0-0 fertilizer, and 600 ppm ACC and 3%, 10%, or 30% 17-0-0 fertilizer reached 50% bud break faster than 1% HC at 8 days. The fastest to reach 50% bud break was 300 ppm ACC and 10% 17-0-0 fertilizer, which reached 50% bud break in 7 days. Control plants took 10 days to reach 50% bud break. This data demonstrates that mixtures of ACC and particular nitrogen containing fertilizers work as well or better than the industry standard HC at causing bud break synchrony.

The mixtures of ACC and 17-0-0 fertilizers provided unexpected combined efficacy for several parameters. Specifically, the mixtures of 100 ppm ACC and 30% 17-0-0 fertilizer, 300 ppm ACC and 3% or 10% 17-0-0 fertilizer and 600 ppm ACC and 3% 17-0-0 fertilizer provided an OCE:ECE ratio from 1.5 to 2.0. Thus, application of mixtures of the present invention lead to unexpected promotion of dormancy break synchrony.

TABLE 9

Days from 0 to 100% Bud Break

|  | 0-100% BB | 0-100% BB ECE | 0-100% BB OCE | 0-100% BB OCE:ECE |
| --- | --- | --- | --- | --- |
| Control | 10 | — | — | — |
| 1% HC (v/v) | 6 | — | — | — |
| ACC 100 ppm | 10 | — | — | — |
| ACC 300 ppm | 13 | — | — | — |
| ACC 600 ppm | 12 | — | — | — |
| CAN17 3% (v/v) | 8 | — | — | — |
| CAN17 10% (v/v) | 12 | — | — | — |
| CAN17 30% (v/v) | 7 | — | — | — |
| ACC 100 ppm + CAN17 10% | 6 | 1.0 | 4 | 7.0 |
| ACC 100 ppm + CAN17 30% | 4 | 3.0 | 6 | 2.0 |
| ACC 300 ppm + CAN17 3% | 5 | 1.0 | 7 | 7.0 |
| ACC 300 ppm + CAN17 10% | 6 | 1.0 | 10 | 10.0 |
| ACC 300 ppm + CAN17 30% | 4 | 1.0 | 7 | 7.0 |
| ACC 600 ppm + CAN17 3% | 10 | 0.0 | 0 | 1.0 |
| ACC 600 ppm + CAN17 10% | 9 | 1.0 | 8 | 8.0 |
| ACC 600 ppm + CAN17 30% | 5 | 1.0 | 5 | 5.0 |

* To calculate OCE:ECE ratios negative expected values were normalized to positive values and the corresponding observed values were increased linearly.

As seen in Table 9, above, application of 1% HC was the standard for bud breaking, causing 100% of the Malus to break dormancy 6 days after 0% of the buds had broken. However, the mixture of 100 ppm ACC and 10% 17-0-0 fertilizer and 300 ppm ACC and 10% 17-0-0 fertilizer reached 0-100% bud break in the same time. Further, the mixture of 300 ppm ACC and 3% 17-0-0 fertilizer, 600 ppm ACC and 30% 17-0-0 fertilizer, 100 ppm ACC and 30% 17-0-0 fertilizer and 300 ppm ACC and 30% 17-0-0 fertilizer reached 0-100% bud break faster than 1% HC at 4-5 days. Control plants took 10 days to reach 0-100% bud break. This data demonstrates that mixtures of ACC and particular nitrogen containing fertilizers work as well or better than the industry standard HC at causing 0-100% bud break.

The mixtures of ACC and 17-0-0 fertilizers provided unexpected combined efficacy for several parameters. Specifically, all mixtures expect 600 ppm ACC and 3% 17-0-0 fertilizer provided an OCE:ECE ratio from 2.0 to 10.0. Thus, application of mixtures of the present invention lead to unexpected promotion of dormancy break synchrony.

TABLE 10

Fresh Weight at Harvest

|  | Mean FW (g) | Mean FW (g) ECE | Mean FW (g) OCE | Mean FW (g) OCE:ECE |
| --- | --- | --- | --- | --- |
| Control | 0.95 | — | — | — |
| 1% HC (v/v) | 1.64 | — | — | — |
| ACC 100 ppm | 0.52 | — | — | — |
| ACC 300 ppm | 1.84 | — | — | — |
| ACC 600 ppm | 1.28 | — | — | — |
| CAN17 3% (v/v) | 1.28 | — | — | — |

TABLE 10-continued

Fresh Weight at Harvest

|  | Mean FW (g) | Mean FW (g) ECE | Mean FW (g) OCE | Mean FW (g) OCE:ECE |
|---|---|---|---|---|
| CAN17 10% (v/v) | 1.59 | — | — | — |
| CAN17 30% (v/v) | 1.65 | — | — | — |
| ACC 100 ppm + CAN17 10% | 1.99 | 0.23 | 1.10 | 4.76 |
| ACC 100 ppm + CAN17 30% | 3.53 | 0.30 | 2.73 | 9.13 |
| ACC 300 ppm + CAN17 3% | 1.78 | 1.29 | 0.88 | 0.68 |
| ACC 300 ppm + CAN17 10% | 4.95 | 1.61 | 4.23 | 2.63 |
| ACC 300 ppm + CAN17 30% | 5.54 | 1.68 | 4.84 | 2.89 |
| ACC 600 ppm + CAN17 3% | 1.97 | 0.70 | 1.08 | 1.55 |
| ACC 600 ppm + CAN17 10% | 2.54 | 1.02 | 1.68 | 1.65 |
| ACC 600 ppm + CAN17 30% | 3.84 | 1.09 | 3.05 | 2.81 |

FW denotes fresh weight

At harvest (28 days after planting), the fresh weight of new growth was assessed. As can be seen in Table 10, above, application of 1% HC was the standard for fresh weight, causing *Prunus* to average 1.64 grams combined new shoot fresh weight. Mixtures of ACC and fertilizer resulted in greater fresh weight than 1% HC. This data demonstrates that mixtures of ACC and particular nitrogen containing fertilizers work as well as the industry leading HC at improving fresh weight.

Further, the mixtures of ACC and 17-0-0 fertilizers provided unexpected combined efficacy for several parameters. Specifically, all mixtures except 300 ppm ACC and 3% 17-0-0 fertilizer resulted in fresh weight per plant with OCE:ECE ratio from 1.55 to 9.13. Thus, application of mixtures of the present invention lead to unexpected promotion of dormancy breaking that are similar to or better than commercial applications.

Example 4—Further ACC Mixtures Efficacy on *Prunus*

Method

To assess the ability of mixtures of the invention to promote and synchronize bud break, these mixtures were applied to *Prunus* (stone fruit) plants in the greenhouse and examined for bud break (initiation of growth) and subsequent shoot development. ACC, Dormex (50% HC), and 15-0-0 fertilizers (CAN15), and mixtures thereof were each applied individually or sequentially (co-applied) to the shoots of *Prunus* plants. Plants were evaluated for bud break from 4-21 days after treatment. Results of these evaluations can be seen below in Tables 11-13, below.

TABLE 11

Bud Break Synchrony

|  | 50% BB | 50% BB ECE | 50% BB OCE | 50% BB OCE:ECE |
|---|---|---|---|---|
| Control | 11 | — | — | — |
| 1% HC (v/v) | 9 | — | — | — |
| ACC 100 ppm | 10 | — | — | — |
| ACC 300 ppm | 10 | — | — | — |
| ACC 600 ppm | 9 | — | — | — |
| CAN15 3% (v/v) | 9 | — | — | — |
| CAN15 6% (v/v) | 8 | — | — | — |
| CAN15 10% (v/v) | 9 | — | — | — |
| ACC 100 ppm + CAN15 6% | 8 | 4.0 | 3 | 0.8 |
| ACC 100 ppm + CAN15 10% | 9 | 3.0 | 2 | 0.7 |
| ACC 300 ppm + CAN15 3% | 7 | 3.0 | 4 | 1.3 |
| ACC 300 ppm + CAN15 6% | 7 | 4.0 | 4 | 1.0 |
| ACC 300 ppm + CAN15 10% | 9 | 3.0 | 2.0 | 0.7 |
| ACC 600 ppm + CAN15 3% | 9 | 4.0 | 2.0 | 0.5 |
| ACC 600 ppm + CAN15 6% | 7 | 5.0 | 4 | 0.8 |
| ACC 600 ppm + CAN15 10% | 8 | 4.0 | 3 | 0.8 |

* To calculate OCE:ECE ratios negative expected values were normalized to positive values and the corresponding observed values were increased linearly.

As seen in Table 11, above, application of 1% HC was the standard for bud breaking, causing 50% of the Malus to break dormancy by 9 DAT. However, the mixture of 100 ppm ACC and 10% 15-0-0 fertilizer and 300 ppm ACC and 10% 15-0-0 fertilizer and 600 ppm ACC and 3% 15-0-0 fertilizer reached bud break in the same time. Further, the mixture of 100 ppm ACC and 6% or 10% 15-0-0 fertilizer, 300 ppm ACC and 3% or 6% 15-0-0 fertilizer, and 600 ppm ACC and 6% or 10% 15-0-0 fertilizer reached 50% bud break faster than 1% HC at 7-8 days. Control plants took 11 days to reach 50% bud break. This data demonstrates that mixtures of ACC and particular nitrogen containing fertilizers work as well or better than the industry standard HC at causing bud break synchrony.

The mixtures of ACC and 15-0-0 fertilizers provided unexpected combined efficacy for several parameters. Specifically, the mixture of 300 ppm ACC and 3% 15-0-0 fertilizer provided an OCE:ECE ratio of 1.3. Thus, application of mixtures of the present invention lead to unexpected promotion of dormancy break synchrony.

TABLE 12

Days from 0 to 100% Bud Break

| | 0-100% BB | 0-100% BB ECE | 0-100% BB OCE | 0-100% BB OCE:ECE |
|---|---|---|---|---|
| Control | 6 | — | — | — |
| 1% HC (v/v) | 6 | — | — | — |
| ACC 100 ppm | 6 | — | — | — |
| ACC 300 ppm | 5 | — | — | — |
| ACC 600 ppm | 7 | — | — | — |
| CAN15 3% (v/v) | 9 | — | — | — |
| CAN15 6% (v/v) | 4 | — | — | — |
| CAN15 10% (v/v) | 5 | — | — | — |
| ACC 100 ppm + CAN15 6% | 5 | 2.0 | 1 | 0.5 |
| ACC 100 ppm + CAN15 10% | 4 | 1.0 | 2 | 2.0 |
| ACC 300 ppm + CAN15 3% | 7 | 1.0 | 2 | 2.0 |
| ACC 300 ppm + CAN15 6% | 7 | 3.0 | −1 | −0.3 |
| ACC 300 ppm + CAN15 10% | 4 | 2.0 | 2 | 1.0 |
| ACC 600 ppm + CAN15 3% | 8 | 4.0 | −2 | −0.5 |
| ACC 600 ppm + CAN15 6% | 5 | 1.0 | 1 | 1.0 |
| ACC 600 ppm + CAN15 10% | 5 | 1.0 | 2 | 2.0 |

* To calculate OCE:ECE ratios negative expected values were normalized to positive values and the corresponding observed values were increased linearly.

As seen in Table 12, above, application of 1% HC was the standard for bud breaking, causing 100% of the Malus to break dormancy 6 days after 0% of the buds had broken. However, the mixture of 100 ppm ACC and 6% or 10% 15-0-0 fertilizer, 300 ppm ACC and 10% 15-0-0 fertilizer and 600 ppm ACC and 6 or 100% 15-0-0 fertilizer reached 0-100% bud break faster than 1% HC at 4-5 days. Control plants took 10 days to reach 0-100% bud break. This data demonstrates that mixtures of ACC and particular nitrogen containing fertilizers work as well or better than the industry standard HC at causing 0-100% bud break.

The mixtures of ACC and 15-0-0 fertilizers provided unexpected combined efficacy for several parameters. Specifically, mixtures of 100 ppm ACC and 10% 15-0-0 fertilizer, 300 ppm ACC and 3% 15-0-0 fertilizer and 600 ppm ACC and 10% 15-0-0 fertilizer provided an OCE:ECE ratio of 2.0. Thus, application of mixtures of the present invention lead to unexpected promotion of dormancy break synchrony.

causing Prunus to average 3.15 grams combined new shoot fresh weight. Mixtures of ACC and fertilizer resulted in greater fresh weight than 1% HC. This data demonstrates that mixtures of ACC and particular nitrogen containing fertilizers work as well as the industry leading HC at improving fresh weight.

Further, the mixtures of ACC and 15-0-0 fertilizers provided unexpected combined efficacy for several parameters. Specifically, all mixtures except 600 ppm ACC and 3% 15-0-0 fertilizer resulted in fresh weight per plant with OCE:ECE ratio from 1.14 to 273.75. Thus, application of mixtures of the present invention lead to unexpected promotion of dormancy breaking that are similar to or better than commercial applications

What is claimed is:

1. An agricultural composition for breaking bud dormancy of woody perennial plants comprising a mixture of an effective amount of 1-amino-1-cyclopropanecarboxylic acid (ACC) or salts thereof and a nitrogen containing fertilizer, wherein the ACC and nitrogen of the nitrogen containing fertilizer are present at a ratio from about 1:8.5 to about

TABLE 13

Fresh Weight at Harvest

| | Mean FW (g) | Mean FW (g) ECE | Mean FW (g) OCE | Mean FW (g) OCE:ECE |
|---|---|---|---|---|
| Control | 1.70 | — | — | — |
| 1% HC (v/v) | 3.15 | — | — | — |
| ACC 100 ppm | 1.01 | — | — | — |
| ACC 300 ppm | 1.46 | — | — | — |
| ACC 600 ppm | 2.57 | — | — | — |
| CAN15 3% (v/v) | 2.71 | — | — | — |
| CAN15 6% (v/v) | 2.37 | — | — | — |
| CAN15 10% (v/v) | 3.42 | — | — | — |
| ACC 100 ppm + CAN15 6% | 4.04 | 0.01 | 1.38 | 273.75 |
| ACC 100 ppm + CAN15 10% | 2.89 | 0.62 | 0.71 | 1.14 |
| ACC 300 ppm + CAN15 3% | 3.47 | 0.46 | 1.04 | 2.28 |
| ACC 300 ppm + CAN15 6% | 4.14 | 0.26 | 1.44 | 5.62 |
| ACC 300 ppm + CAN15 10% | 4.49 | 0.88 | 1.65 | 1.87 |
| ACC 600 ppm + CAN15 3% | 2.65 | 1.11 | 0.56 | 0.51 |
| ACC 600 ppm + CAN15 6% | 3.72 | 0.91 | 1.20 | 1.31 |
| ACC 600 ppm + CAN15 10% | 7.12 | 1.53 | 3.20 | 2.09 |

FW denotes fresh weight

At harvest (28 days after planting), the fresh weight of new growth was assessed. As can be seen in Table 13, above, application of 1% HC was the standard for fresh weight, 1:510, wherein the nitrogen containing fertilizer is selected from the group consisting of 15-0-0 fertilizer and 17-0-0 fertilizer.

2. The composition of claim 1, wherein the nitrogen containing fertilizer is a calcium ammonium nitrate fertilizer.

3. A method of promoting bud break in woody perennial plants comprising applying an effective amount of 1-amino-l-cyclopropanecarboxylic acid (ACC) or salts thereof and an effective amount of a nitrogen containing fertilizer, wherein the ACC and nitrogen of the nitrogen containing fertilizer are present at a ratio from about 1:8.5 to about 1:510, wherein the nitrogen containing fertilizer is selected from the group consisting of 15-0-0 fertilizer and 17-0-0 fertilizer.

4. The method of claim 3, wherein the plant growth is plant shoot growth.

5. The method of claim 3, wherein the woody perennial plant is a tree of the genus *Prunus* or *Malus*.

6. The method of claim 3, wherein ACC or salts thereof and the nitrogen containing fertilizer are applied sequentially or concurrently.

7. A method of synchronizing bud break in woody perennial plants comprising applying an effective amount of ACC and an effective amount of a nitrogen containing fertilizer, wherein the ACC and nitrogen of the nitrogen containing fertilizer are present at a ratio from about 1:8.5 to about 1:510, wherein the nitrogen containing fertilizer is selected from the group consisting of 15-0-0 fertilizer and 17-0-0 fertilizer.

8. The method of claim 7, wherein the plant growth is plant shoot growth.

9. The method of claim 7, wherein the woody perennial plant is a grape vine.

10. The method of claim 7, wherein the woody perennial plant is a tree of the genus *Prunus* or *Malus*.

11. The method of claim 7, wherein ACC or salts thereof and the nitrogen containing fertilizer are applied sequentially or concurrently.

12. A method of promoting plant growth in woody perennial plants comprising applying an effective amount of 1-amino-l-cyclopropanecarboxylic acid (ACC) or salts thereof and an effective amount of nitrogen of a nitrogen containing fertilizer, wherein the ACC and the nitrogen containing fertilizer are present at a ratio from about 1:8.5 to about 1:510, wherein the nitrogen containing fertilizer is selected from the group consisting of 15-0-0 fertilizer and 17-0-0 fertilizer.

13. The method of claim 12, wherein the plant growth is plant shoot growth.

14. The method of claim 12, wherein the woody perennial plant is a tree of the genus *Prunus* or *Malus*.

15. The method of claim 12, wherein ACC or salts thereof and the nitrogen containing fertilizer are applied sequentially or concurrently.

* * * * *